United States Patent
Cullen et al.

(10) Patent No.: US 8,653,797 B2
(45) Date of Patent: Feb. 18, 2014

(54) SYNCHRONOUS ELECTRICAL MACHINE

(75) Inventors: John J. A. Cullen, Derby (GB); David R. Trainer, Derby (GB); Stephen A. Long, Carmel, IN (US); Angus G. L. Moodie, Glasgow (GB)

(73) Assignee: Rolls-Royce PLC, London (GB)

( * ) Notice: Subject to any disclaimer, the term of this patent is extended or adjusted under 35 U.S.C. 154(b) by 589 days.

(21) Appl. No.: 12/995,527

(22) PCT Filed: May 12, 2009

(86) PCT No.: PCT/GB2009/001185
§ 371 (c)(1),
(2), (4) Date: Dec. 1, 2010

(87) PCT Pub. No.: WO2010/004239
PCT Pub. Date: Jan. 14, 2010

(65) Prior Publication Data
US 2011/0080000 A1 Apr. 7, 2011

(30) Foreign Application Priority Data
Jun. 9, 2008 (GB) .................................. 0810400.2

(51) Int. Cl.
*H02P 3/18* (2006.01)
(52) U.S. Cl.
USPC ............................................ 322/20; 318/700
(58) Field of Classification Search
USPC ................................. 322/20, 37; 318/700, 701
See application file for complete search history.

(56) References Cited

U.S. PATENT DOCUMENTS 8,395,346 B2 * 3/2013 Trainer et al. ................. 318/700
2005/0093521 A1 5/2005 Nishimura et al.

FOREIGN PATENT DOCUMENTS

| DE | 10 2006 040 738 A1 | 3/2008 |
| EP | 1 705 789 A2 | 9/2006 |
| RU | 2 195 762 C1 | 12/2002 |
| WO | WO 99/41829 A2 | 8/1999 |
| WO | WO 2009/007671 A2 | 1/2009 |

OTHER PUBLICATIONS

Haylock, J. A., "Fault Tolerant Drives for Safety Critical Applications," Newcastle upon Tyne University, Jan. 1998, pp. 196-197.
Mitcham et al., "Implications of shorted turn faults in bar wound PM machines," *IEE Proc.-Electr. Power Appl.*, vol. 151, No. 6, Nov. 2004, pp. 651-657.

(Continued)

*Primary Examiner* — Nicholas Ponomarenko
(74) *Attorney, Agent, or Firm* — Oliff PLC

(57) ABSTRACT

A synchronous electrical machine comprises a plurality of phases and detecting means arranged to detect an open-circuit fault in at least one of the phases of the synchronous electrical machine. Isolating means is arranged to isolate the at least one phase of the synchronous electrical machine with the fault. Phase shift means are arranged to produce a controlled phase shift between the voltage and the current within the remaining phases of the synchronous electrical machine so as to adjust the phase angle of the second harmonic powers produced by the remaining phases of the synchronous electrical machine such that the vector sum of the second harmonic power vectors of the remaining phases of the synchronous electrical machine is zero to eliminate torque ripple. The phase shift means is arranged to adjust the phase angle of all the remaining phases by the same predetermined angle to maximize the torque ripple-free power output of the synchronous electrical machine.

20 Claims, 4 Drawing Sheets

(56) References Cited

OTHER PUBLICATIONS

Say M. G., *Alternating Current Machines*, 5th Edition, Longman, 1983, pp. 95-96.

British Search Report issued in Application No. 0810400.2; Dated Oct. 9, 2008.
International Search report issued in Application No. PCT/GB2009/001185; Dated Aug. 3, 2009.

* cited by examiner

Pre-Fault: 5 phasors ( 2nd harmonics )
separated by 360°/5 = 72°

Pre-Fault : the 5 phasors
when rearranged sum to zero

Open-Circuit Fault:
no 2nd. harmonic power from phase 0

Open-Circuit Fault : 2nd harmonic
powers no longer sum to zero

Open-Circuit-Fault: 2nd harmonic phasors
before and after rebalancing by phase shifting

SYNCHRONOUS ELECTRICAL MACHINE

The present invention relates to a synchronous electrical machine, particularly a synchronous electrical machine, e.g. an electrical starter/generator, for a gas turbine engine.

In current aerospace applications electrical power is generated using traditional wound-field synchronous electrical machines. These synchronous electrical machines are coupled to a rotor of the gas turbine engine using a complex mechanical transmission system, for example a radial drive shaft from the gas turbine engine rotor and a gearbox. These synchronous electrical machines are mounted on the gas turbine engine in a position where they are readily accessible for maintenance and/or replacement if there is a fault with the synchronous electrical machine.

It is proposed to embed the synchronous electrical machine in the gas turbine engine, for example the rotor of the synchronous electrical machine is coupled to the rotor of the gas turbine engine. The advantage of the embedded synchronous electrical machine is that it allows the complex mechanical transmission system to be removed, or greatly simplified, providing significant operational and efficiency benefits. However, these embedded synchronous electrical machines are difficult to remove and replace if there is a fault/failure. EP0659234B1 discloses the use of coupled synchronous electrical machines and embedded synchronous electrical machines in gas turbine engines.

It is desirable to use the synchronous electrical machine to start the gas turbine engine, as well as to generate electricity, as this removes the reliance on an air starter and provides additional engine design benefits. A power electronic interface is provided with the synchronous electrical machine to enable the synchronous electrical machine to act as a motor rather than a generator. In particular the power electronic interface allows the input and output frequencies to be different irrespective of whether the synchronous electrical machine is operating as a motor or a generator. Electrical generator systems utilising power electronic converters enable very high power dense machine technologies, for example permanent magnet designs to be employed in the synchronous electrical machine, which gives further size and weight benefits compared to traditional synchronous electrical machines.

There is a need for high reliability and fault tolerant embedded synchronous electrical machines for aircraft gas turbine engines. In particular there is a need for synchronous electrical machines which are tolerant to an open-circuit fault in one of the phases.

Accordingly the present invention seeks to provide a novel synchronous electrical machine which reduces, preferably overcomes, the above mentioned problem.

Accordingly the present invention provides a synchronous electrical machine comprising a plurality of phases, detecting means arranged to detect a fault in at least one of the phases of the synchronous electrical machine, isolating means arranged to isolate the at least one phase of the synchronous electrical machine with the fault, phase shift means arranged to produce a controlled phase shift between the voltage(emf) and the current within the remaining phases of the synchronous electrical machine to adjust the phase angle of the second harmonic powers produced by the remaining phases of the synchronous electrical machine such that the vector sum of the second harmonic power vectors of the remaining phases of the synchronous electrical machine is zero to eliminate torque ripple and the phase shift means is arranged to move the phase angles of all the remaining phases by the same predetermined angle to maximise the power output of the synchronous electrical machine.

Preferably the phase shift means comprises a plurality of converters, each phase having a respective converter.

Preferably the synchronous electrical machine is a motor/generator.

Preferably the synchronous electrical machine is a starter/generator.

Preferably the synchronous electrical machine comprises a permanent magnet electrical machine.

Preferably the synchronous electrical machine comprises a rotor having a plurality of circumferentially spaced permanent magnets and a stator having a plurality of electrical coils.

Preferably the synchronous electrical machine comprises three or more phases.

Preferably the synchronous electrical machine comprises five phases. The five phases are arranged at 72 electrical degrees apart.

Typically the five phases are arranged at 72 electrical degrees apart and the second harmonic power angles of the five phases are separated by angles of 144 electrical degrees, the phase shift means is arranged to produce a 18 degree phase shift advance between the voltage(emf) and the current within a first one of the remaining phases, a 36 degree phase shift advance between the voltage(emf) and the current within a second one of the remaining phases, a 54 degree phase shift advance between the voltage(emf) and the current within a third one of the remaining phases, a 72 degree phase shift advance between the voltage(emf) and the current within a fourth one of the remaining phases of the synchronous electrical machine such that the vector sum of the second harmonic power vectors of the remaining phases of the synchronous electrical machine is zero to eliminate torque ripple.

Preferably the phase shift means is arranged to produce an additional 45 degree phase shift retardation to all the remaining phases to maximise the power output of the synchronous electrical machine.

Preferably the phase shift means are arranged to produce a net 27° phase angle retardation in the first one of the remaining phases, a net 9° retardation in the second one of the remaining phases, a net 9° phase angle advance in the third one of the remaining phases and a net 27° phase angle advance in the fourth one of the remaining phases.

Preferably the synchronous electrical machine comprises a synchronous reluctance electrical machine.

The present invention also provides a method of operating a synchronous electrical machine comprising a plurality of phases, the method comprising detecting a fault in at least one of the phases of the synchronous electrical machine, isolating the at least one phase of the synchronous electrical machine with the fault, producing a controlled phase shift between the voltage(emf) and the current within the remaining phases of the synchronous electrical machine to adjust the phase angle of the second harmonic powers produced by the remaining phases of the synchronous electrical machine such that the vector sum of the second harmonic power vectors of the remaining phases of the synchronous electrical machine is zero to eliminate torque ripple and moving the phase angles of all the remaining phases by the same predetermined angle to maximise the power output of the synchronous electrical machine.

Preferably each phase having a respective converter, the method comprising using the converters to produce the controlled phase shift.

Preferably the synchronous electrical machine is a motor/generator.

Preferably the synchronous electrical machine is a starter/generator.

Preferably the synchronous electrical machine comprises a permanent magnet electrical machine.

Preferably the synchronous electrical machine comprises a rotor having a plurality of circumferentially spaced permanent magnets and a stator having a plurality of electrical coils.

Preferably the synchronous electrical machine comprises three or more phases.

Preferably the synchronous electrical machine comprises five phases.

Preferably the five phases are arranged at 72 electrical degrees apart.

Typically the five phases are arranged at 72 electrical degrees apart and the second harmonic power angles of the five phases are separated by angles of 144 electrical degrees, producing a 18 degree phase shift advance between the voltage(emf) and the current within a first one of the remaining phases, a 36 degree phase shift advance between the voltage (emf) and the current within a second one of the remaining phases, a 54 degree phase shift advance between the voltage (emf) and the current within a third one of the remaining phases, a 72 degree phase shift advance between the voltage (emf) and the current within a fourth one of the remaining phases of the synchronous electrical machine such that the vector sum of the second harmonic power vectors of the remaining phases of the synchronous electrical machine is zero to eliminate torque ripple.

Preferably producing an additional 45 degree phase shift retardation to all the remaining phases to maximise the power output of the synchronous electrical machine.

Preferably producing a net 27° phase angle retardation in the first one of the remaining phases, a net 9° retardation in the second one of the remaining phases, a net 9° phase angle advance in the third one of the remaining phases and a net 27° phase angle advance in the fourth one of the remaining phases.

Alternatively the synchronous electrical machine comprises a synchronous reluctance electrical machine.

The present invention will be more fully described by way of example with reference to the accompanying drawings in which.

Figure 1:
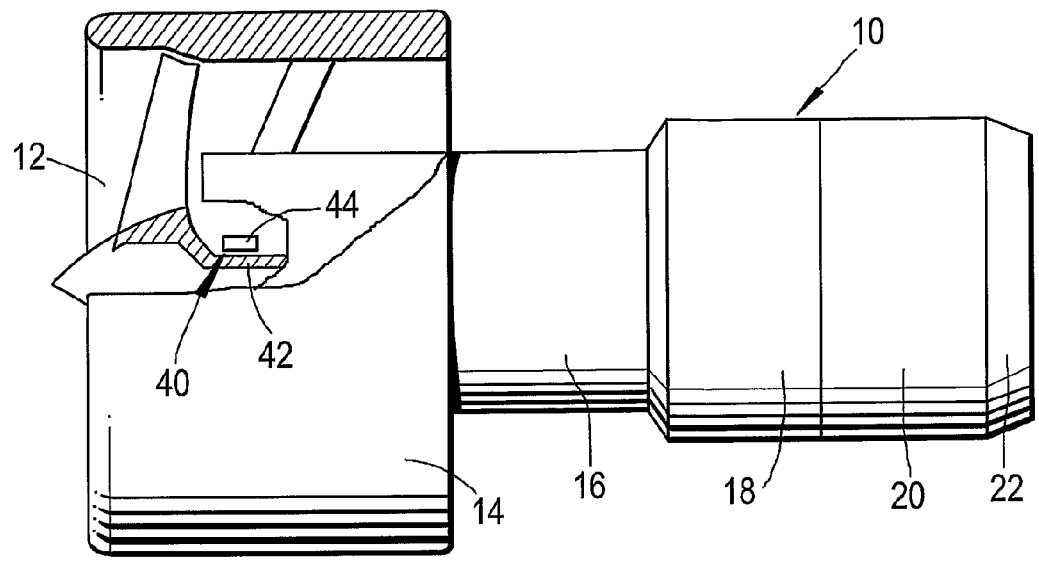
FIG. 1 shows a turbofan gas turbine engine having a synchronous electrical machine according to the present invention.

A turbofan gas turbine engine 10, as shown in FIG. 1, comprises an intake 12, a fan section 14, a compressor section 16, a combustion section 18, a turbine section 20 and an exhaust 22. The turbine section 20 comprises a high pressure turbine, an intermediate pressure turbine and a low pressure turbine. The compressor section comprises an intermediate pressure compressor and a high pressure compressor and the fan section comprises a fan. The high pressure turbine is arranged to drive the high pressure compressor via a first shaft, the intermediate pressure turbine is arranged to drive the intermediate pressure compressor via a second shaft and the low pressure turbine is arranged to drive the fan via a third shaft. A synchronous electrical machine 40 is embedded in the turbofan gas turbine engine 10.

Figure 2:
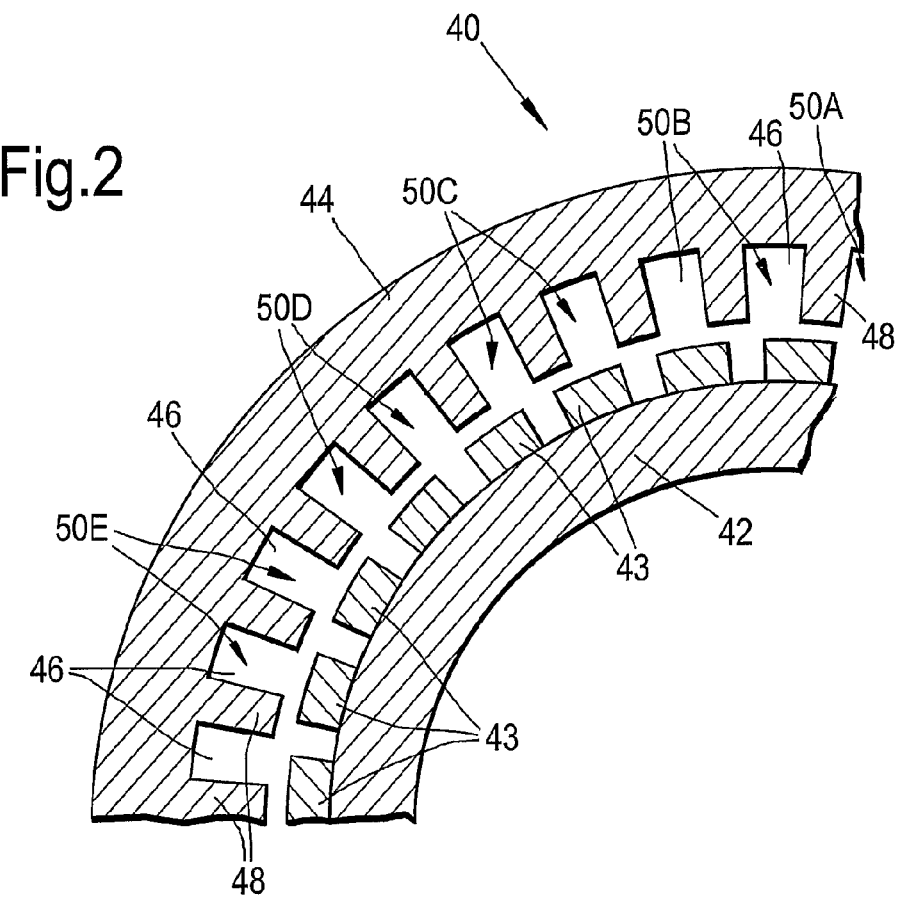
FIG. 2 shows a part cross-sectional view through the synchronous electrical machine shown in FIG. 1.

The synchronous electrical machine 40, as shown more clearly in FIG. 2, comprises a rotor 42 having a plurality of circumferentially spaced permanent magnets 43 on the periphery of the rotor 42 and a stator 44 having a plurality of electrical coils 46 arranged on radially inwardly extending teeth 48 on the stator 44. The coils 46 are arranged as a plurality of power generating phases. The rotor 42 of the synchronous electrical machine 40 is driven by the third shaft of the turbofan gas turbine engine 10 in this arrangement, but may equally well be driven by the second shaft or the first shaft of the turbofan gas turbine engine 10.

The synchronous electrical machine 40, in particular a permanent magnet electrical generator comprises a plurality of identical phases 50A, 50B, 50C, 50D and 50E, which are magnetically, electrically and thermally isolated from each other such that a fault in any one of the phases does not affect any of the other phases. The electrical impedance of these phases 50A, 50B, 50C, 50D and 50E of the permanent magnet electrical generator 40 is deliberately arranged to be high to limit the fault current that occurs during a short circuit condition at the synchronous electrical machine terminals enabling the system to continue to operate safely within designed thermal limits.

The magnitude of the alternating voltage produced at the terminals of the permanent magnet electrical generator 40 changes with the speed of rotation of the rotor of the permanent magnet electrical machine 40, and hence the speed of rotation of the rotor of the turbofan gas turbine engine 10, and the source impedance causes added regulation effects as the electrical load changes. The multi-phase nature of such a permanent magnet electrical generator 40 means that the output phases have to be combined to enable the output power to be practically distributed to the electrical load centres.

Figure 3:
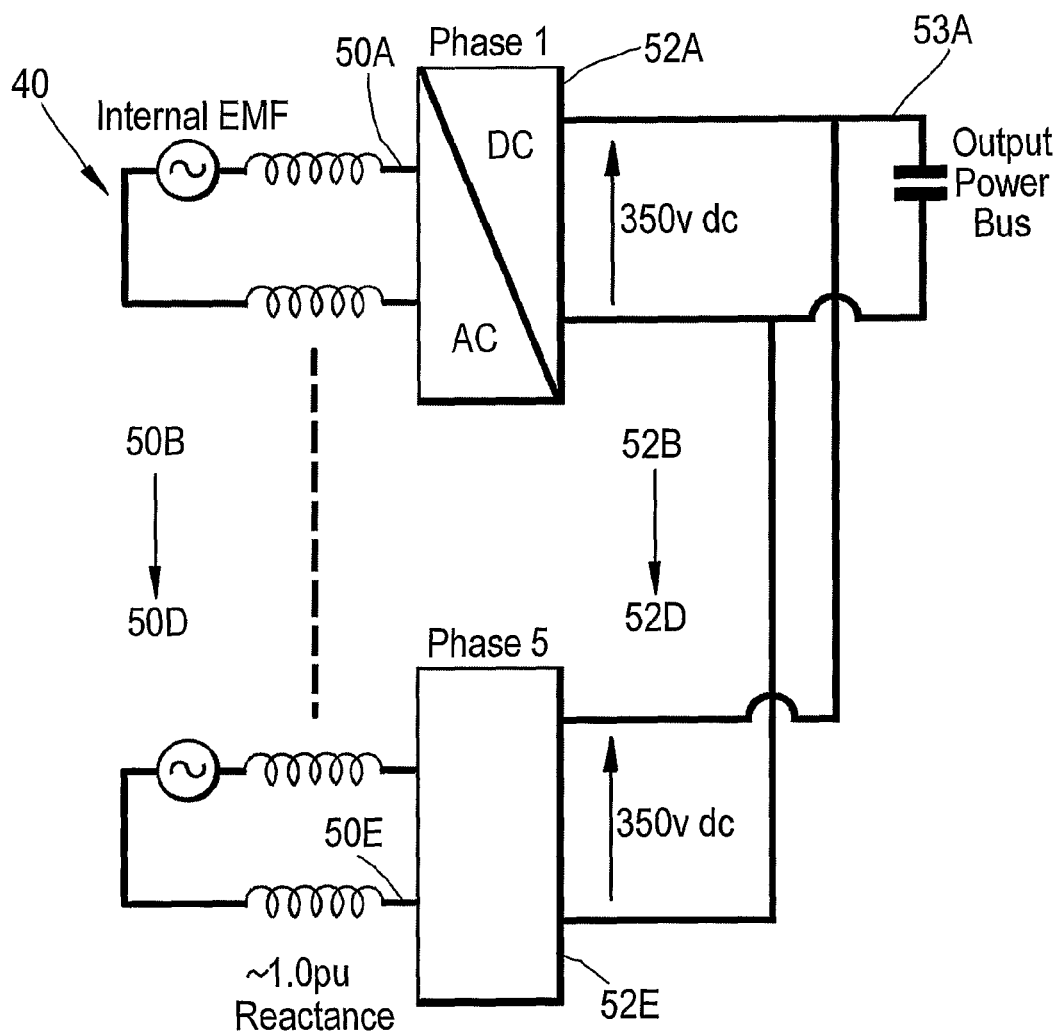
FIG. 3 shows a diagrammatic view of a synchronous electrical machine and power electronic converter according to the present invention.

Each phase 50A, 50B, 50C, 50D and 50E of the synchronous electrical machine 40 is provided with a respective one of a plurality of power electronic AC to DC converters 52A, 52B, 52C, 52D and 52E. The combination of the power generator phases and the voltage regulation issues are accommodated using these power electronic AC to DC converters 52A, 52B, 52C, 52D and 52E, which enable the systems to be combined at a common DC bus 53 as shown in FIG. 3. It may be possible for the AC to DC converters 52A to 52E to produce voltages other than 350 volts. Alternatively the converters 52A to 52E may be AC to AC converters.

It is known that a single electrical phase provides electrical power, which pulses at a second harmonic frequency compared to the electrical frequency of the voltage and current.

The synchronous electrical machine 40 is optimised for its normal operating condition, i.e. no fault. For example the synchronous electrical machine 40 has five phases 50A, 50B, 50C, 50D and 50E and the e.m.fs of the phases are arranged at 72 electrical degrees apart. This is fixed in the design of the synchronous electrical machine 40. In general for a synchronous electrical machine 40 with m phases, the phases are arranged at 360/m electrical degrees apart and the second harmonic power angles of the m phases are separated by angles of 2×360/m electrical degrees in an un-faulted operation.

Such a synchronous electrical machine 40 works well in normal operation when there isn't a fault. However, once an open-circuit fault occurs, the associated faulted phase of the synchronous electrical machine 40 is isolated, the combined constant power output characteristic is lost. This occurs because the second harmonic components of the power contributed from the remaining four phases of the synchronous electrical machine 40 no longer add to zero. This is a serious disadvantage, because of the resulting large torque ripple.

In the present invention the converters are arranged, operated, to restore the cancellation of the second harmonic powers when the circuit configuration is changed during an open-circuit fault condition. For example if there is a fault in phase five 50E, the converter 52E detects a fault in phase five 50E of the synchronous electrical machine 40 and the converter 52E is arranged to isolate phase five 50E of the synchronous electrical machine 40. The remaining converters 52A, 52B, 52C and 52D are arranged to produce a controlled phase shift between the fundamental voltage (e.m.f) and the fundamental current within the remaining phases 50A, 50B, 50C and 50D of the synchronous electrical machine 40 such that the vector sum of the second harmonic power vectors of the remaining phases 50A, 50B, 50C and 50D of the synchronous electrical machine 40 is zero to eliminate torque ripple.

In particular the remaining converters 52A, 52B, 52C and 52D are arranged to adjust the phase angle of the fundamental currents produced by the remaining phases 50A, 50B, 50C and 50D of the synchronous electrical machine 40 such that the angles of separation between the remaining phases are again equal, 90 electrical degrees, such that the vector sum of the second harmonic current vectors of the remaining phases 50A, 50B, 50C and 50D of the synchronous electrical machine 40 is actually zero. This eliminates, or substantially eliminates torque ripple in the synchronous electrical machine 40.

Once the second harmonic power vectors have been arranged to sum up to zero, the remaining converters 52A, 52B, 52C and 52D are then all arranged to move the phase angles of the fundamental currents in the remaining phases 50A, 50B, 50C and 50D by the same angle such that the output torque/power of the synchronous electrical machine is maximised.

The principles of the present invention will be described with reference to a synchronous electrical machine with five phases.

Consider a single phase carrying a fundamental sinusoidal e.m.f. $E.\sin(wt)$ and fundamental current $I.\sin(wt+phi)$, where phi is the phase angle between the e.m.f. and the current. The instantaneous power p in this phase is:

1. $P=E.I.\sin(wt).\sin(wt+phi)=0.5E.I[\cos(phi)-\cos(2wt+phi)]$

Pre-fault in a five phase fault-tolerant synchronous electrical machine the phases (numbered 0, 1, 2, 3 and 4) have their e.m.fs equally spaced in time such that, when all phases operate at the same phase angle phi (i.e. balanced operation as is preferred), their net instantaneous power P is:

2. $P=p0+\ldots+p4=0.5\{5E.I.\cos(phi)-E.I.[\cos(2wt+phi+(0\times 144°))+\ldots+\cos(2wt+phi+(4\times 144°))]\}$ 3. where $144°=2\times 72°$ and is the separation of the second harmonic powers in a five phase synchronous electrical machine (i.e. $360°/5=)72°$.

Figure 4A:
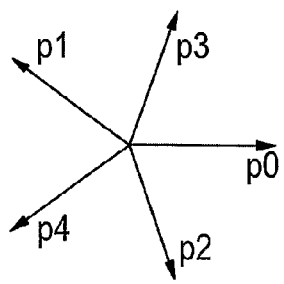
FIG. 4a is a graph showing the second harmonic power vectors for a five phase synchronous electrical machine in normal operation.
Figure 4B:
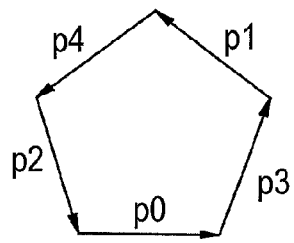
FIG. 4b is a graph showing the second harmonic power vectors for a five phase synchronous electrical machine in normal operation with the second harmonic power vectors rearranged to show they sum to zero.

4. Algebra shows, also see FIGS. 4a and 4b, that all the terms of the form $\cos(2wt+phi+(n\times 144°))$ sum to zero, where n=0, 1, 2, 3 or 4. Hence the pre-fault instantaneous electrical power is independent of time, $P=2.5E.I.\cos(phi)$ for a five phase synchronous electrical machine, and so there is no torque ripple in the synchronous electrical machine.

Figure 5A:
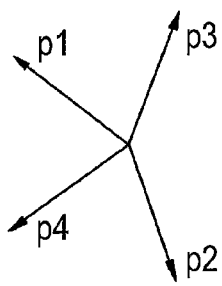
FIG. 5a is a graph showing the second harmonic power vectors for a five phase synchronous electrical machine with one phase having an open-circuit fault.
Figure 5B:
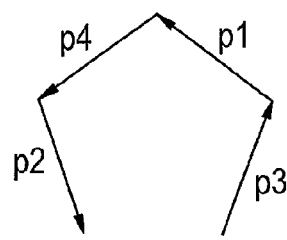
FIG. 5b is a graph showing the second harmonic power vectors for a five phase synchronous electrical machine with one phase having an open-circuit fault with the second harmonic power vectors rearranged to show they do not sum to zero.

Suppose now that an open-circuit fault occurs in one of the five phases of the synchronous electrical machine, say phase 0. The four remaining terms of the form $\cos(2wt+phi+(n\times 144°))$ from equation 2 no longer sum to zero, see FIGS. 5a and 5b, and so the net instantaneous electrical power includes $\cos(2wt+\ldots)$ terms. Thus, the fault in phase 0 has introduced a torque ripple in the synchronous electrical machine.

The present invention seeks to restore a balanced operation of the synchronous electrical machine such that the $\cos(2wt+\ldots)$ terms once again cancel out despite the synchronous electrical machine having an open-circuit fault in one of the phases.

Figure 6:
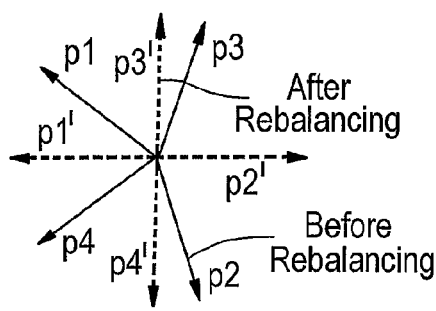
FIG. 6 is a graph showing the second harmonic power vectors for a five phase synchronous electrical machine with one phase having an open-circuit fault before and after the phase angles of the second harmonic power vectors have been adjusted so they sum to zero.

The present invention achieves this by using the power electronic converter of each phase to adjust the phase angle, phi, of the fundamental current for the respective phase. From equation 2 it is seen that if the phase angles of the currents of the phases are advanced, in anti-clockwise direction, as follows then a power balanced, four phase, system results, see FIG. 6:

4a. Phase 3, phi=phi+18°, phase 1, phi=phi+36°, phase 4, phi=phi+54° and phase 2, phi=phi+72°.

The mathematics of the rebalancing is given in equation 5, where only the second harmonic terms of power from equation 2 are listed so as to demonstrate that they sum to zero after re-balancing:

5. $P'_{2nd\ harmonic}=0.5E.I[\cos(2wt+\{phi+36°\}+144°)+\cos(2wt+\{phi+72°\}+288°)+\cos(2wt+\{phi+18°\}+432°)+\cos(2wt+\{phi+54°\}+576°)]$ 6. Hence, $p'_{2nd\ harmonic}=)0.5E.I[\cos(2wt+phi+180°)+\cos(2wt+phi+0°)+\cos(2wt+phi+90°)+\cos(2wt+phi+270°]=0$ 7. Now that each phase has its own phase angle, which is different from that in the other phases, the net time-invariant or ripple-free power, which is $0.5\times 5E.I\cos(phi)=2.5E.I\cos(phi)$ in equation 2, becomes from equation 1 and 4a:

8. Torque ripple-free power $p'=0.5E.I[\cos(phi+36°)+\cos(phi+72°)+\cos(phi+18°)+\cos(phi+54°)]$ 8a. If, pre-fault, the ripple-free power from the five phases given by equation 1 is defined to be 100% power.

9. Then with one phase open-circuit the maximum ripple-free power is potentially 80%, assuming no up-rating of the four remaining un-faulted phases.

Figure 7:
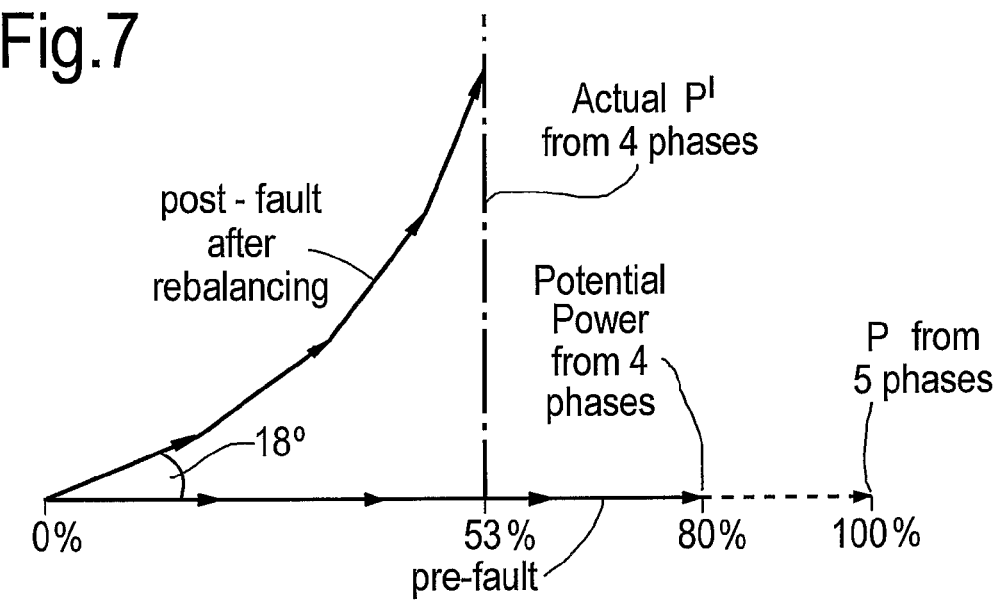
FIG. 7 is a graph showing ripple-free power phasors for a five phase synchronous electrical machine before a fault and after phase angle re-balancing following an open-circuit fault in one of the phases.

10. However, the ripple-free power given in equation 8 is less than the 80% maximum. It may be shown by mathematics similar to that used to calculate the distribution factor of electrical machine windings, that equation 8, i.e. post fault re-balancing when one phase has previously gone open-circuit, represents only 53% ripple-free power, see FIG. 7.

The reduction in total output torque ripple-free power is caused primarily by the action of adjusting the relative phase angles of the $2^{nd}$ harmonic components of power to facilitate cancellation. This causes non-useful reactive power to be produced, which reduces the total real power available.

Figure 8:
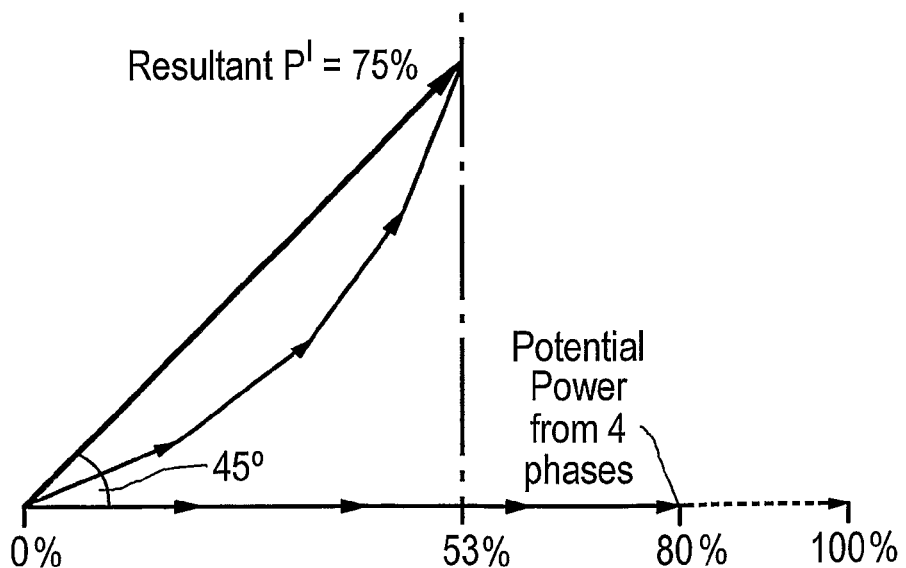
FIG. 8 is a graph showing ripple-free power phasors for a five phase synchronous electrical machine before a fault and after phase angle re-balancing and phase shifting to increase power following an open-circuit fault in one of the phases.

In order to recover the ripple-free power from 53% towards the 80% level it is necessary to retard, i.e. rotate clockwise, the resultant p' by 45°, see FIG. 8, so that it aligns with the "potential from four phases" line and thereby contributes its full 75% ripple-free power.

11. This rotation is achieved by using the power electronic converter on each phase to change the phase angle, phi to phi−45°. Mathematically equation 8 becomes:

12. Torque ripple-free power p"=0.5E.I[cos(phi−45°+36°+)cos(phi−45°+72°)+cos(phi−45°+18°)+cos(phi−45°+54°)]= 0.5E.I[cos(phi−9°)+cos(phi+27°)+cos(phi−27°)+cos(phi+9°)]

The trigonometrical identity cos(A−B)+cos(A+B)=2.cosA. .cosB can be used to simplify equation 12 as follows:

13a. cos(phi−9°)+cos(phi+9°)=2 cos(phi)cos(9°).

13b. cos(phi−27°)+cos(phi+27°)=2 cos(phi)cos(27°).

14. Hence p"=0.5E.I×2 cos(phi)×[cos(9°)+cos(27°)]= 1.879E.I.cos(phi).

15. It is seen from equations 7, 8a and 14 that the ripple-free power post open-circuit fault and post-rebalancing can be as high as p"/p=1.879/2.5×100%=75%.

16. Since the maximum power from four phases of a five phase synchronous electrical machine is 80% of rated power, the cost of implementing the ripple-free strategy is only 80−75%=5% of rated power.

If the pre-fault phase angle, phi, is such that the modulus of phi >0° then the modulus of phi can be reduced towards zero to increase the power thereby reducing the cost, equation 16, of the ripple-free strategy towards zero. There are a number of changes, up to three, to the phase angle of each phase when implementing the above strategy. An intelligent controller is capable of achieving these changes all at once. Note that, throughout most of the above, electrical power has been the parameter used to describe the ripple-free strategy. However, since (i) power is the product of rotational speed and torque and (ii) rotational speed is assumed to be sensibly constant, which is true when the electrical power is small compared to the system power, for example in a synchronous electrical machine driven by an aircraft gas turbine engine, then the above applies equally well to ripple-free electromagnetic torque.

The advantage of the present invention is that it allows a synchronous electrical machine, which has an open-circuit fault in one phase, to operate without producing torque ripple while producing torque/power, closer to the theoretical maximum for a faulted synchronous electrical machine, e.g. it maximises the torque ripple-free power output of the synchronous electrical machine. Thus, this will eliminate vibration and/or damage due to resonance.

The present invention is applicable to any synchronous electrical machine which has a plurality of independent phases, in particular three of more phases, and each independent phase has its own independent power electronic converter and provided the phases are balanced and equally spaced in time pre-fault. Note that fault tolerant synchronous electrical machine usually have four, five, six or seven phases.

Although the present invention has been described with reference to a fault in a single phase and isolation of the single phase, the present invention is equally applicable if there are faults in more than one phase and isolation of more than one phase. Although the present invention has been described with reference to a permanent magnet synchronous electrical machine the present invention is also applicable to a synchronous reluctance electrical machine or other electrical machines. The present invention is applicable to any topology of synchronous electrical machine, e.g. axial flux electrical machines. The present invention is also applicable to synchronous electrical machines other than 1 per unit reactance electrical machines.

Although the present invention has been described with reference to a turbofan gas turbine engine, the present invention is equally applicable to other aero gas turbine engines e.g. turbojet, turbopropeller or turboshaft gas turbine engines and also to marine and industrial gas turbine engines.

Although the present invention has been described with reference to a three shaft gas turbine engine it is equally applicable to a two shaft gas turbine engine or a single shaft gas turbine engine.

Although the present invention has been described with reference to the synchronous electrical machine being embedded in the gas turbine engine it is equally possible to apply the present invention to synchronous electrical machines at other positions on the gas turbine engine.

The present invention is also applicable for synchronous electrical machines for other applications, especially for fault tolerant synchronous electrical machines, e.g. where high torque densities and high availability is required for example in safety critical applications.

In the present invention the ripple free power refers to the mechanical power on the shaft/rotor of the synchronous electrical machine and not the electrical power at the terminals of the synchronous electrical machine.

The invention claimed is:

1. A synchronous electrical machine comprising a plurality of phases, detecting means arranged to detect a fault in at least one of the phases of the synchronous electrical machine, isolating means arranged to isolate the at least one phase of the synchronous electrical machine with the fault, phase shift means arranged to produce a controlled phase shift between the voltage and the current within the remaining phases of the synchronous electrical machine to adjust the phase angle of the second harmonic powers produced by the remaining phases of the synchronous electrical machine such that the vector sum of the second harmonic power vectors of the remaining phases of the synchronous electrical machine is zero to eliminate torque ripple and the phase shift means is arranged to move the phase angles of all the remaining phases by the same predetermined angle to maximise the power output of the synchronous electrical machine.

2. A synchronous electrical machine as claimed in claim 1 wherein the phase shift means comprises a plurality of converters, each phase having a respective converter.

3. A synchronous electrical machine as claimed in claim 1 wherein the synchronous electrical machine is a motor/generator.

4. A synchronous electrical machine as claimed in claim 3 wherein the synchronous electrical machine is a starter/generator.

5. A synchronous electrical machine as claimed in claim 1, wherein the synchronous electrical machine comprises a permanent magnet electrical machine or a synchronous reluctance electrical machine.

6. A synchronous electrical machine as claimed in claim 5 wherein the synchronous electrical machine comprises a rotor having a plurality of circumferentially spaced permanent magnets and a stator having a plurality of electrical coils.

7. A synchronous electrical machine as claimed in claim 1 comprising three or more phases.

8. A synchronous electrical machine as claimed in claim 7 comprising five phases.

9. A synchronous electrical machine as claimed in claim 8 wherein the five phases are arranged at 72 electrical degrees apart.

10. A synchronous electrical machine as claimed in claim 9 wherein the five phases are arranged at 72 electrical degrees apart and the second harmonic power angles of the five phases are separated by angles of 144 electrical degrees, the phase shift means is arranged to produce a 18 degree phase shift advance between the voltage and the current within a first one of the remaining phases, a 36 degree phase shift advance between the voltage and the current within a second one of the remaining phases, a 54 degree phase shift advance between the voltage and the current within a third one of the remaining phases, a 72 degree phase shift advance between the voltage and the current within a fourth one of the remaining phases of the synchronous electrical machine such that the vector sum of the second harmonic power vectors of the remaining phases of the synchronous electrical machine is zero to eliminate torque ripple.

11. A synchronous electrical machine as claimed in claim 10 wherein the phase shift means is arranged to produce an additional 45 degree phase shift retardation to all the remaining phases to maximise the power output of the synchronous electrical machine.

12. A gas turbine engine including a synchronous electrical machine as claimed in claim 1.

13. A method of operating a synchronous electrical machine comprising a plurality of phases, the method comprising detecting a fault in at least one of the phases of the synchronous electrical machine, isolating the at least one phase of the synchronous electrical machine with the fault, producing a controlled phase shift between the voltage and the current within the remaining phases of the synchronous electrical machine to adjust the phase angle of the second harmonic powers produced by the remaining phases of the synchronous electrical machine such that the vector sum of the second harmonic power vectors of the remaining phases of the synchronous electrical machine is zero to eliminate torque ripple and moving the phase angles of all the remaining phases by the same predetermined angle to maximise the power output of the synchronous electrical machine.

14. A method as claimed in claim 13 wherein each phase having a respective converter, the method comprising using the converters to produce the controlled phase shift.

15. A method as claimed in claim 13 wherein the synchronous electrical machine is a motor/generator.

16. A method as claimed in claim 13 comprising three or more phases.

17. A method as claimed in claim 16 comprising five phases.

18. A method as claimed in claim 17 wherein the five phases are arranged at 72 electrical degrees apart.

19. A method as claimed in claim 18 wherein the five phases are arranged at 72 electrical degrees apart and the second harmonic power angles of the five phases are separated by angles of 144 electrical degrees, producing a 18 degree phase shift advance between the voltage and the current within a first one of the remaining phases, a 36 degree phase shift advance between the voltage and the current within a second one of the remaining phases, a 54 degree phase shift advance between the voltage and the current within a third one of the remaining phases, a 72 degree phase shift advance between the voltage and the current within a fourth one of the remaining phases of the synchronous electrical machine such that the vector sum of the second harmonic power vectors of the remaining phases of the synchronous electrical machine is zero to eliminate torque ripple.

20. A synchronous electrical machine as claimed in claim 19 producing an additional 45 degree phase shift retardation to all the remaining phases to maximise the power output of the synchronous electrical machine.

* * * * *